(12) United States Patent
Normandin et al.

(10) Patent No.: US 8,973,271 B2
(45) Date of Patent: Mar. 10, 2015

(54) METHOD FOR MANUFACTURING AN INTEGRAL DUPLEX BEARING

(75) Inventors: John P. Normandin, Henniker, NH (US); Walter Richard Gist, Jr., Greer, SC (US)

(73) Assignee: Schatz Bearing Corporation, Poughkeepsie, NY (US)

( * ) Notice: Subject to any disclaimer, the term of this patent is extended or adjusted under 35 U.S.C. 154(b) by 766 days.

(21) Appl. No.: 13/178,890

(22) Filed: Jul. 8, 2011

(65) Prior Publication Data

US 2013/0008028 A1 Jan. 10, 2013

(51) Int. Cl.
*B21D 53/10* (2006.01)

(52) U.S. Cl.
CPC ...................................... *B21D 53/10* (2013.01)
USPC .............. 29/898.066; 29/898.061; 29/898.04; 384/499; 384/502; 384/504

(58) Field of Classification Search
CPC ...... F16C 33/30; F16C 33/38; F16C 33/3862; F16C 33/40; F16C 33/405; F16C 33/58; F16C 33/585; F16C 43/04; F16C 33/60; B23P 15/003; B29L 2031/04; B60B 27/0005; B21K 1/05; B21H 1/12
USPC .................. 29/898, 898.04, 898.06, 898.061, 29/898.062, 898.063, 898.066; 384/499, 384/502, 503, 504
See application file for complete search history.

(56) References Cited

U.S. PATENT DOCUMENTS

| 1,379,945 A | 5/1921 | Teetsow |
| 1,495,564 A | 5/1924 | Vinçon |
| 1,543,135 A | 6/1925 | Vinçon |
| 1,783,791 A | 12/1930 | Hughes |
| 2,632,677 A | 3/1953 | Potter |
| 3,405,434 A | 10/1968 | Hoffman et al. |
| 3,958,847 A | 5/1976 | Cain et al. |
| 3,986,754 A | 10/1976 | Torrant |
| 4,054,339 A | 10/1977 | Ladin |
| 4,788,758 A | 12/1988 | Gordon et al. |
| 4,802,278 A * | 2/1989 | Vanderpol et al. ................ 30/97 |

(Continued)

OTHER PUBLICATIONS

Reali-Slim® Thin-Section Bearings for Semiconductor Applications, Design Engineer's Selection Guide, Kaydon®, Turning Ideas Into Engineered Solutions, © 2005 Kaydon Corporation.

(Continued)

*Primary Examiner* — David Bryant
*Assistant Examiner* — Jun Yoo
(74) *Attorney, Agent, or Firm* — Baker Botts L.L.P.

(57) ABSTRACT

In certain embodiments, a method for manufacturing an integral duplex bearing having an outer ring, a first inner ring, and a second inner ring includes forming a first outer raceway and a second outer raceway in an inner surface of the outer ring. The method further includes forming a first inner raceway in an outer surface of the first inner ring and a second inner raceway in an outer surface of the second inner ring while the first inner ring and the second inner ring are joined together. The first and second inner rings each have an outer surface diameter less than an inner surface diameter of the outer ring such that the first and second inner rings may be positioned inside the outer ring with the first inner raceway located adjacent to the first outer raceway and the second inner raceway located adjacent to the second outer raceway. The method further includes separating the first inner ring from the second inner ring.

11 Claims, 3 Drawing Sheets

(56) References Cited

U.S. PATENT DOCUMENTS

| | | | |
|---|---|---|---|
| 4,858,294 A | | 8/1989 | Hollox |
| 4,865,468 A | * | 9/1989 | Kato et al. ............... 384/448 |
| 5,261,159 A | * | 11/1993 | Yasuda et al. ............ 29/898.066 |
| 5,711,074 A | | 1/1998 | Harimoto et al. |
| 6,332,265 B1 | | 12/2001 | Tonooka |
| 6,394,657 B1 | | 5/2002 | Takamizawa et al. |
| 7,377,695 B2 | | 5/2008 | Qiu et al. |
| 7,685,717 B2 | | 3/2010 | Shibata et al. |
| 2003/0093903 A1 | | 5/2003 | Obara |
| 2004/0123464 A1 | | 7/2004 | Nagano |
| 2006/0242836 A1 | | 11/2006 | Nagano |
| 2006/0242837 A1 | | 11/2006 | Nagano |
| 2009/0199404 A1 | | 8/2009 | Tsukamoto et al. |

OTHER PUBLICATIONS

RBC Aerospace Bearings, Unique Design Solutions to Complex Problems, The Global Leader in Gimbal Bearings, © 2007 RBC Bearings Incorporated.

* cited by examiner

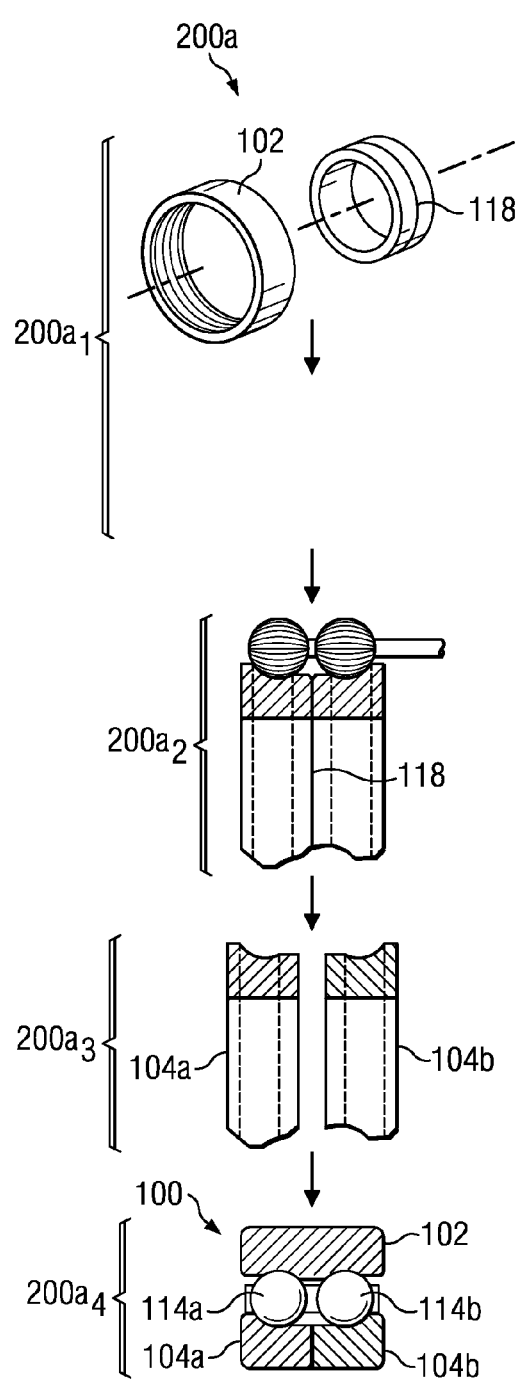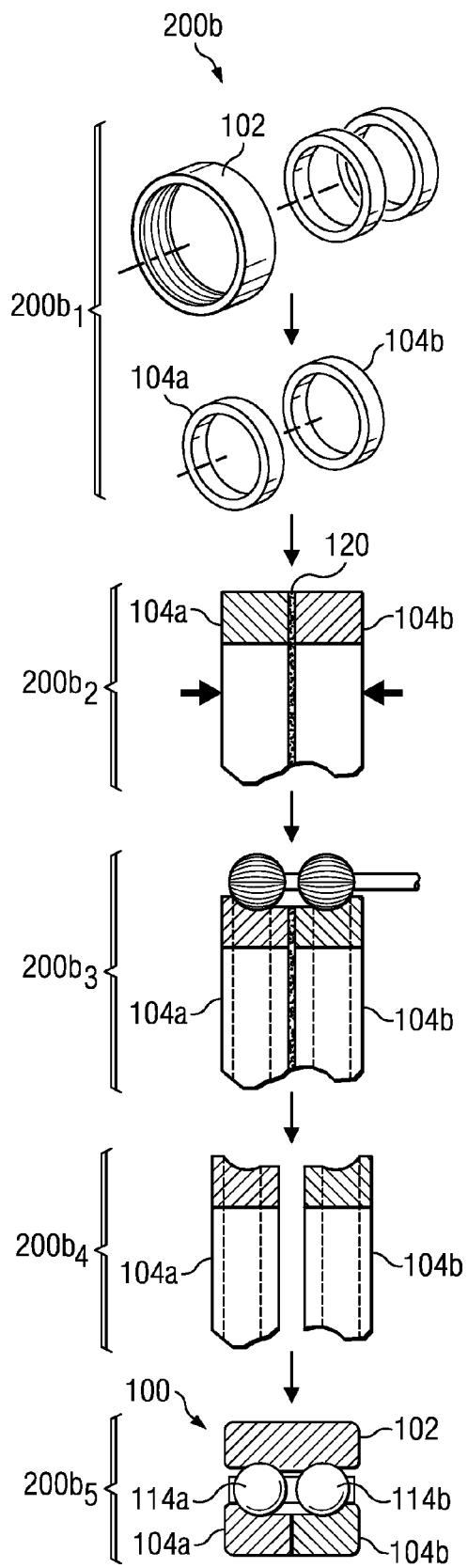
FIG. 2A
FIG. 2B

METHOD FOR MANUFACTURING AN INTEGRAL DUPLEX BEARING

TECHNICAL FIELD

This invention relates generally to bearings and more particularly to a method for manufacturing an integral duplex bearing.

BACKGROUND

A ball bearing is a type of bearing that uses balls to maintain separation between the moving parts of the bearing during radial loading, thrust loading, and/or moment loading. One purpose of a ball bearing is to reduce rotational friction. Reduction of rotational friction may be achieved by using at least one raceway in each of an inner ring and an outer ring, the raceways containing a plurality of balls used to transmit loads. Usually one of the rings (either the inner ring or the outer ring) is held fixed while the other is permitted to rotate. As one of the bearing rings rotates, it causes the balls to rotate between the rings. Because the balls are rolling they have a much lower coefficient of friction than if two surfaces were sliding against each other, thereby reducing friction.

OVERVIEW

According to embodiments of the present invention, disadvantages and problems associated with previous methods for manufacturing integral duplex bearings may be reduced or eliminated.

In certain embodiments, a method for manufacturing an integral duplex bearing having an outer ring, a first inner ring, and a second inner ring includes forming a first outer raceway and a second outer raceway in an inner surface of the outer ring. The method further includes forming a first inner raceway in an outer surface of the first inner ring and a second inner raceway in an outer surface of the second inner ring while the first inner ring and the second inner ring are joined together. The first and second inner rings each have an outer surface diameter less than an inner surface diameter of the outer ring such that the first and second inner rings may be positioned inside the outer ring with the first inner raceway located adjacent to the first outer raceway and the second inner raceway located adjacent to the second outer raceway. The method further includes separating the first inner ring from the second inner ring.

Particular embodiments of the present disclosure may provide one or more technical advantages. For example, because the inner rings of the integral duplex bearing remain joined during the forming of the inner raceways, the inner raceways may be precisely matched to one another, as well as to the outer raceways, at the time of forming. As a result, the tedious and time consuming process of matching inner rings having separately-ground inner raceways prior to assembly of the integral duplex bearing (as in certain conventional methods of manufacture) may be avoided, thereby decreasing the cost of manufacture of an integral duplex bearing. Additionally, because the inner rings of the integral duplex bearing remain joined during the grinding of the inner raceways, the spacing and/or dimensions of the inner raceways may be more precisely controlled (as compared to methods of manufacture in which inner raceways may be ground in separate inner rings). As a result, it may be possible to manufacture the integral duplex bearing in a wider variety of dimensions (e.g., smaller dimensions for which precise dimension control may be of increased importance). The decrease in cost of manufacture of the integral duplex bearing combined with the ability to the manufacture integral duplex bearing in a wider variety of dimensions may make the integral duplex bearing a more attractive alternative to certain conventional bearings (e.g., X-type bearings) in certain applications.

Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 2A-2D illustrate example methods for manufacturing the example integral duplex bearing depicted in FIG. 1, according to certain embodiments of the present invention.

DETAILED DESCRIPTION OF THE DRAWINGS

Figure 1A:
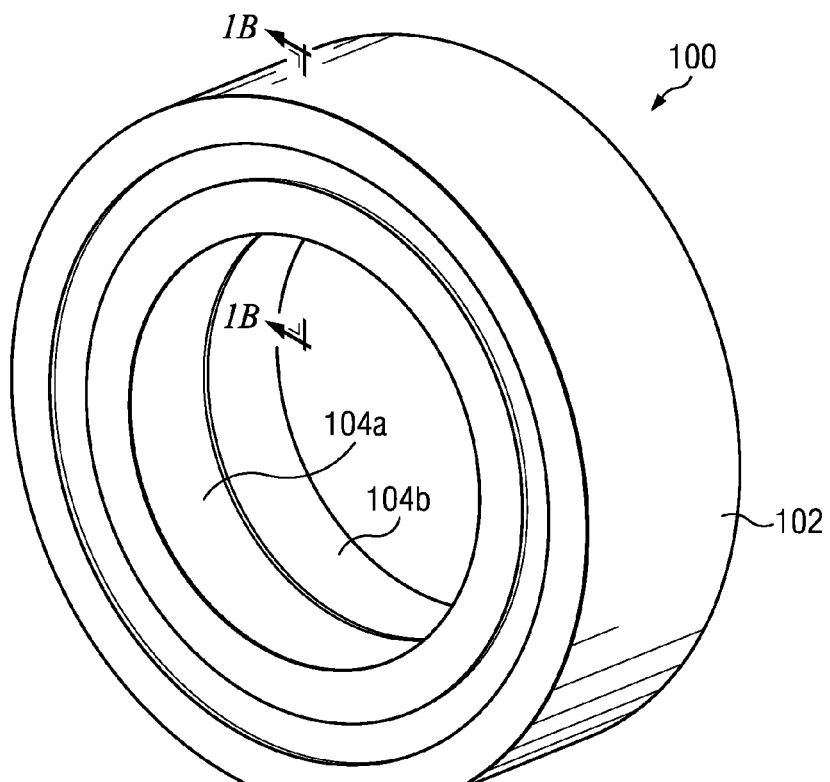
FIGS. 1A-1B illustrate an example integral duplex bearing, which may be manufactured according certain embodiments of the present invention.
Figure 1B:
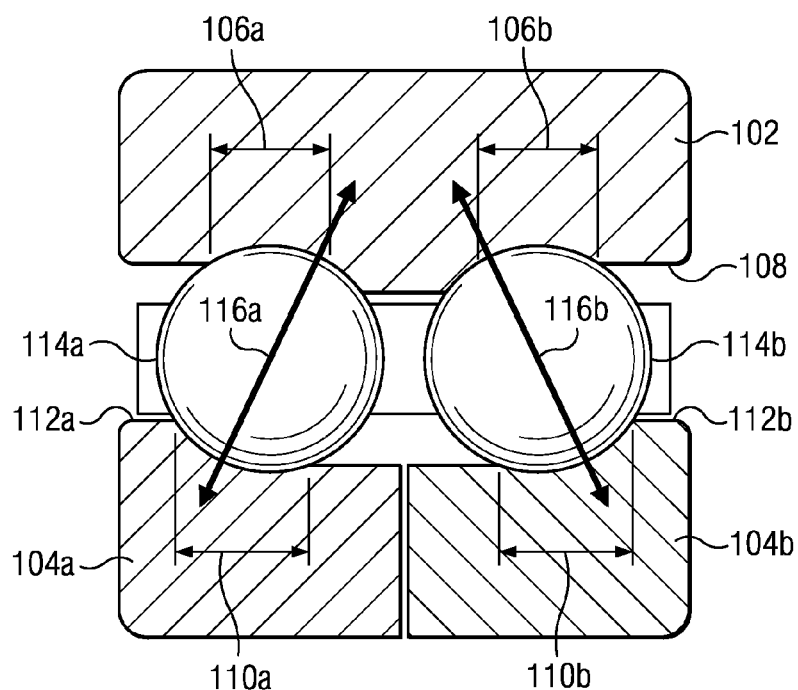

FIG. 1 illustrates an example integral duplex bearing 100, which may be manufactured according certain embodiments of the present invention. Integral duplex bearing 100 may include a single outer ring 102 along with two inner rings 104a and 104b. Outer ring 102 may include outer raceways 106a and 106b each formed in an inner surface 108 of outer ring 102. Additionally, inner ring 104a may include an inner raceway 110a formed in an outer surface 112a of inner ring 104a and inner ring 104b may include an inner raceway 110b formed in an outer surface 112b of inner ring 104b. In certain embodiments, a raceway may be "formed" in a surface of a ring by grinding the raceway into the surface of the ring. Although each raceway of bearing 100 is described as being ground into a corresponding surface of a ring throughout the remainder of this description, the present disclosure contemplates any suitable method for forming a raceway in a surface of a ring, according to particular needs. For example, in certain embodiments, a portion of a raceway may be formed in a surface of a ring at the time the ring itself is formed (e.g., using a turning operation), with the raceway being ground to achieve a final, precise dimension.

When integral duplex bearing 100 is assembled, inner ring 104a may be positioned with respect to outer ring 102 such that each of a first plurality of balls 114a contact at least a portion of both inner raceway 110a and outer raceway 106a. Similarly, inner ring 104b may be positioned with respect to outer ring 102 such that each of a second plurality of balls 114b contact at least a portion of both inner raceway 110b and outer raceway 106b. Moreover, the geometry of outer ring 102, inner rings 104a and 104b, outer ring raceways 106a and 106b, inner ring raceways 110a and 110b, and balls 114a and 114b may be such that integral duplex bearing 100, when assembled, has raceway contact points creating contact angles 116a and 116b. Additionally, the bearing components can be assembled in a precise manner to create an axial preload. In certain embodiments, the axial preload may be achieved by having a set amount of internal deflection in the components of integral duplex bearing 100.

Preloading forces and contact angles 116a and 116b may make integral duplex bearing 100 suitable for thrust loading applications (in either direction), radial loading applications, and/or moment loading applications. Accordingly, integral duplex bearing 100 may be a suitable replacement for a number of conventional bearings, such as standard X-type bearings (also know as four point bearings) and/or standard A-type bearings (either of which may be commonly used in one or more of the above-discussed loading applications). Moreover, integral duplex bearing 100 may provide certain advantages over conventional bearings (e.g., X-type bearings and/or A-type bearings), such as a longer life and/or higher operating speeds.

Although integral duplex bearing 100 is depicted and primarily described as being assembled from particular components, the present disclosure contemplates integral duplex bearing 100 being assembled from any suitable components, according to particular needs. Moreover, although the components of integral duplex bearing 100 are depicted with particular relative dimensions, the present disclosure contemplates integral duplex bearing 100 having components with any suitable relative dimensions, according to particular needs.

FIGS. 2A-2D illustrate example methods 200a-200d for manufacturing example integral duplex bearing 100, according to certain embodiments of the present invention. In general, each of the methods 200a-200d involves keeping inner rings 104a and 104b joined together during the grinding of inner raceways 110a and 110b, with the inner rings 104a and 104b being separated prior to assembling bearing 100. Although the present invention contemplates that, in certain embodiment, a portion of inner raceways 110a and 110b may be ground prior to joining inner rings 104a and 104b together (with the remainder of inner raceways 110a and 110b being ground after joining inner rings 104a and 104b together), inner raceways 110a and 110b are depicted and described below as being ground only while inner rings 104a and 104b are joined together for purposes of simplicity.

Because the inner rings 104a and 104b of integral duplex bearing 100 remain joined during the grinding of inner raceways 110a and 110b, inner raceways 110a and 110b may be precisely matched to one another as well as to outer raceways 106a and 106b at the time of grinding. As a result, the tedious and time consuming process of matching inner rings having separately-ground inner raceways 110a and 110b prior to assembly of bearing 100 (as in certain conventional methods of manufacture) may be avoided, thereby decreasing the cost of manufacture of integral duplex bearing 100. Additionally, because the inner rings 104a and 104b of integral duplex bearing 100 remain joined during the grinding of inner raceways 110a and 110b, the spacing and/or dimensions of inner raceways 110a and 110b may be more precisely controlled (as compared to methods of manufacture in which inner raceways 110a and 110b may be ground in separate inner rings 104a and 104b). As a result, it may be possible to manufacture integral duplex bearing 100 in a wider variety of dimensions (e.g., smaller dimensions for which precise dimension control may be of increased importance). The decrease in cost of manufacture of integral duplex bearing 100 combined with the ability to manufacture integral duplex bearing 100 in a wider variety of dimensions may make integral duplex bearing 100 a more attractive alternative to certain conventional bearings (e.g., X-type bearings) in certain applications.

FIG. 2A depicts a first example method 200a for manufacturing integral duplex bearing 100. In general, method 200a involves forming inner ring 104a and inner ring 104b out of a single piece of material prior to the grinding of inner raceways 110a and 110b, with the single piece of material being separated into an inner ring 104a and inner ring 104b prior to assembly of integral duplex bearing 100.

At step $200a_1$, outer raceways 106a and 106b are each ground in inner surface 108 of outer ring 102, outer ring 102 having been previously formed, such as by sizing a piece of raw material (e.g., by cutting, machining, turning, milling, grinding, or otherwise sizing the material), heat treating the material, and/or hardening the material. Additionally, at step $200a_1$, inner rings 104a and 104b are formed out of a single piece of material, such as by sizing the single piece of raw material (e.g., by cutting, milling, grinding, or otherwise sizing the material), heat treating the single piece of material, and/or hardening the single piece of material. Additionally, the single piece of material may be scored with a score line 118 (e.g., an circumferential, V-shaped groove) defining the line of demarcation between inner ring 104a and inner ring 104b. Although a single score line 118 is depicted as being located on outer surface 112 of inner rings 104, the present disclosure contemplates a score line 118 be additionally or alternatively located on an inner surface of inner rings 104.

At step $200a_2$, inner raceway 110a is ground in the portion of the single piece of material corresponding to outer surface 112a of inner ring 104a. Additionally inner raceway 110b is ground in the portion of the single piece of material corresponding to outer surface 112b of inner ring 104b. Because inner ring 104a and inner ring 104b remain joined together during the grinding of inner raceways 110a and 110b (as they are part of a single piece of material), the dimensions and/or spacing of inner raceways 110a and 110b may be more precisely controlled, as compared to grinding inner raceways 110a and 110b in separate inner rings 104a and 104b.

Having ground inner raceways 110a and 110b in the single piece of material, the single piece of material is fractured along score line 118 at step $200a_3$ to separate inner ring 104a from inner ring 104b. In certain embodiments, a pin or a ball may be forced through one or more holes formed in the single piece of material (e.g., four equally spaced holes may be formed in the single piece of material at step $200a_1$), the pin or ball having a slightly larger diameter than the hole through which it is forced such that the pin or ball causes the single piece of material to be fractured along score line 118. Integral duplex bearing 100 may then be assembled at step $200a_4$.

FIG. 2B depicts a second example method 200b for manufacturing integral duplex bearing 100. In general, method 200b involves forming inner ring 104a and inner ring 104b out of two separate pieces of material prior to the grinding of inner raceways 110a and 110b. The two separate pieces of material are bonded together during the grinding of inner raceways 110a and 110b and then separated prior to assembly of integral duplex bearing 100.

At step $200b_1$, outer raceways 106a and 106b are each ground in inner surface 108 of outer ring 102, outer ring 102 having been previously formed, such as by sizing a piece of raw material (e.g., by cutting, milling, machining, turning, grinding, or otherwise sizing the material), heat treating the material, and/or hardening the material. Additionally, at step $200b_1$, inner ring 104a is formed out of a first piece of material and inner ring 104b is formed out of a second piece of material. Inner rings 104a and 104b may each be formed by sizing a piece of raw material (e.g., by cutting, milling, grinding, or otherwise sizing the material), heat treating the material, and/or hardening the material.

At step $200b_2$, an adhesive 120 (e.g., an epoxy or any other suitable adhesive) is applied to corresponding surfaces of inner ring 104a and inner ring 104b. Those corresponding surface are then placed adjacent to one another such that adhesive 120, when set, serves to join inner ring 104a and inner ring 104b together. At step $200b_3$, inner raceway 110a is ground in outer surface 112a of inner ring 104a and inner raceway 110b is ground in outer surface 112b of inner ring 104b, adhesive 120 keeping inner ring 104a and inner ring 104b joined together during the grinding process. Because inner ring 104a and inner ring 104b remain joined together during the grinding of inner raceways 110a and 110b (using adhesive 120), the dimensions and/or spacing of inner raceways 110a and 110b may be more precisely controlled, as compared to grinding inner raceways 110a and 110b in separate inner rings 104a and 104b.

Having ground inner raceways 110a and 110b in inner rings 104a and 104b, inner ring 104a may be separated from inner ring 104b at step $200b_4$. For example, inner ring 104a may be separated from inner ring 104b by applying a solvent to inner rings 104a and 104b, the solvent acting to dissolve the adhesive 120 joining inner rings 104a and 104b together. As an additional example, inner ring 104a may be separated from inner ring 104b by applying heat to inner rings 104a and 104b, the heat acting to loosen the bond caused by adhesive 120 joining inner rings 104a and 104b together such that inner rings 104a and 104b may be separated. Integral duplex bearing 100 may then be assembled at step $200b_5$.

Figure 2C:
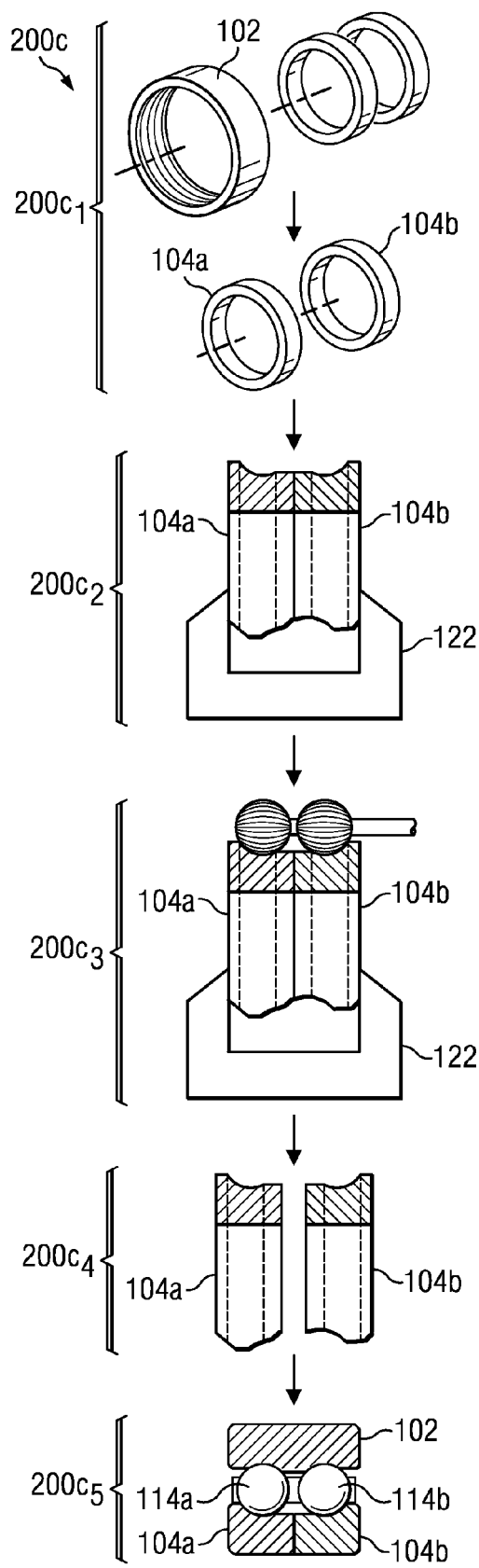

FIG. 2C depicts a third example method 200c for manufacturing integral duplex bearing 100. In general, method 200c involves forming inner ring 104a and inner ring 104b out of two separate pieces of material prior to the grinding of inner raceways 110a and 110b. The two separate pieces of material are clamped together during the grinding of inner raceways 110a and 110b and separated prior to assembly of integral duplex bearing 100.

At step $200c_1$, outer raceways 106a and 106b are each ground in inner surface 108 of outer ring 102, outer ring 102 having been previously formed, such as by sizing a piece of raw material (e.g., by cutting, machining, turning, milling, grinding, or otherwise sizing the material), heat treating the material, and/or hardening the material. Additionally, at step $200c_1$, inner ring 104a is formed out of a first piece of material and inner ring 104b is formed out of a second piece of material. Inner rings 104a and 104b may each be formed by sizing a piece of raw material (e.g., by cutting, milling, grinding, or otherwise sizing the material), heat treating the material, and/or hardening the material.

At step $200c_2$, a clamping device 122 is applied to inner ring 104a and inner ring 104b. In certain embodiments (as depicted in FIG. 2C), clamping device 122 may comprise a device configured to extend through the open center portions of inner rings 104a and 104b. Once clamping device 122 is extended through the open center portions of inner rings 104a and 104b, it may be expanded such that lips of the clamping device may engage outer surfaces of inner ring 104a and inner ring 104b thereby holding inner rings 104a and 104b together. Although a particular clamping device 122 is illustrates and primarily described, the present invention contemplates any suitable clamping device 122, according to particular needs.

At step $200c_3$, inner raceway 110a is ground in outer surface 112a of inner ring 104a and inner raceway 110b is ground in outer surface 112b of inner ring 104b, clamping device 122 keeping inner ring 104a and inner ring 104b joined together during the grinding process. Because inner ring 104a and inner ring 104b remain joined together during the grinding of inner raceways 110a and 110b (using clamping device 122), the dimensions and/or spacing of inner raceways 110a and 110b may be more precisely controlled, as compared to grinding inner raceways 110a and 110b in separate inner rings 104a and 104b.

Having ground inner raceways 110a and 110b in inner rings 104a and 104b, inner ring 104a may be separated from inner ring 104b by removing clamping device 122 at step $200c_4$. Integral duplex bearing 100 may then be assembled at step $200c_5$.

Figure 2D:
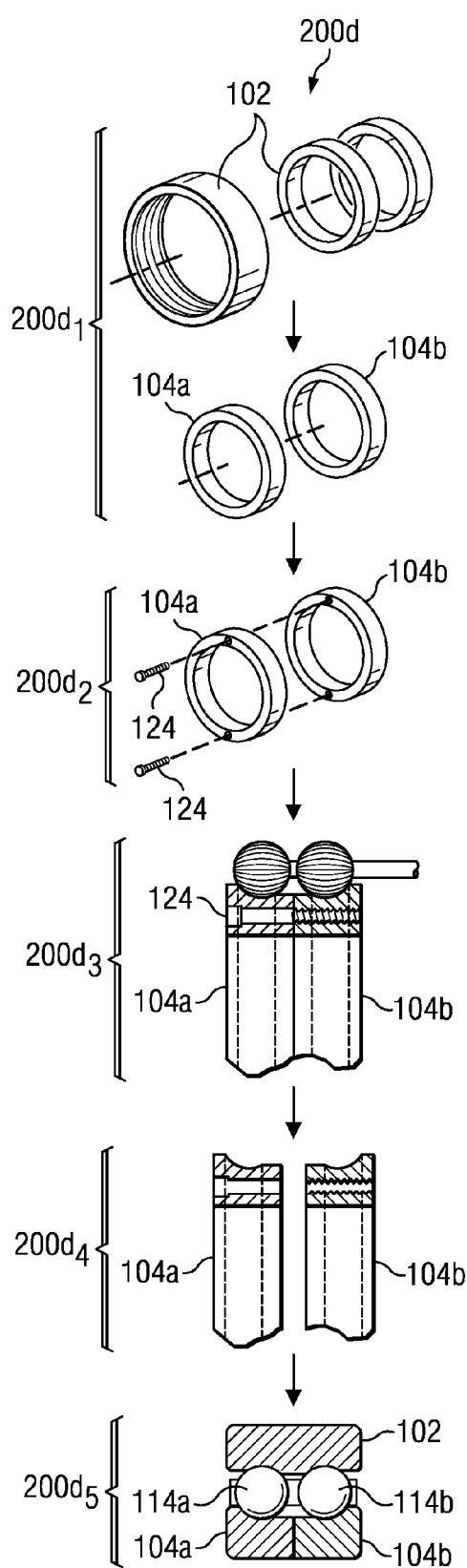

FIG. 2D depicts a fourth example method 200d for manufacturing integral duplex bearing 100. In general, method 200d involves forming inner ring 104a and inner ring 104b out of two separate pieces of material prior to the grinding of inner raceways 110a and 110b. The two separate pieces of material are fastened together using one or more fasteners 124 during the grinding of inner raceways 110a and 110b and separated prior to assembly of integral duplex bearing 100.

At step $200d_1$, outer raceways 106a and 106b are each ground in inner surface 108 of outer ring 102, outer ring 102 having been previously formed, such as by sizing a piece of raw material (e.g., by cutting, milling, machining, turning, grinding, or otherwise sizing the material), heat treating the material, and/or hardening the material. Additionally, at step $200d_1$, inner ring 104a is formed out of a first piece of material and inner ring 104b is formed out of a second piece of material. Inner rings 104a and 104b may each be formed by sizing a piece of raw material (e.g., by cutting, milling, grinding, or otherwise sizing the material), heat treating the material, and/or hardening the material.

At step $200d_2$, inner ring 104a and inner ring 104b are joined together using a plurality of fasteners 124. For example, a plurality of smooth boreholes may be formed in inner ring 104a and a plurality of threaded boreholes may be formed in inner ring 104 b. A fastener 124 may then be passed through each of the smooth boreholes of inner ring 104a such that a threaded portion of the fastener 124 engages the threads of a corresponding threaded borehole of inner ring 104b. Although inner rings 104a and 104b are depicted as being joined using a particular number of fasteners 124, the present disclosure contemplates inner rings 104a and 104b being joined using any suitable number of fasteners, according to particular needs. Additionally, although inner rings 104a and 104b are depicted as being joined using a particular type of fasteners 124, the present invention contemplates inner rings 104a and 104b being joined using any suitable type of fasteners 124, according to particular needs.

At step $200d_3$, inner raceway 110a is ground in outer surface 112a of inner ring 104a and inner raceway 110b is ground in outer surface 112b of inner ring 104b, inner ring 104a and inner ring 104b being held together during the grinding process by fasteners 124. Because inner ring 104a and inner ring 104b remain joined together during the grinding of inner raceways 110a and 110b (using fasteners 124), the dimensions and/or spacing of inner raceways 110a and 110b may be more precisely controlled, as compared to grinding inner raceways 110a and 110b in separate inner rings 104a and 104b.

Having ground inner raceways 110a and 110b in inner rings 104a and 104b, inner ring 104a may be separated from inner ring 104b by removing fasteners 124 at step $200d_4$. Integral duplex bearing 100 may then be assembled at step $200d_5$.

Although the steps of methods 200a-200d have each been described as being performed in a particular order, the present invention contemplates that the steps of methods 200a-200d may each be performed in any suitable order, according to particular needs.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for manufacturing an integral duplex bearing, the integral duplex bearing having an outer ring, a first inner ring, and a second inner ring, the method comprising:
   forming a first outer raceway and a second outer raceway in an inner surface of the outer ring, the outer ring having an inner surface diameter;
   forming a first inner raceway in an outer surface of the first inner ring and a second inner raceway in an outer surface of the second inner ring while the first inner ring and the second inner ring are joined together, the first inner raceway and the second inner raceway formed with an orientation relative to each other, the first and second inner rings each having an outer surface diameter less than the inner surface diameter of the outer ring such that the first and second inner rings may be positioned inside the outer ring with the first inner raceway located adjacent to the first outer raceway and the second inner raceway located adjacent to the second outer raceway;
   separating the first inner ring from the second inner ring;
   positioning the first inner ring inside the outer ring such that a first plurality of balls contact at least a portion of both the first inner raceway and the first outer raceway; and
   positioning the second inner ring inside the outer ring such that a second plurality of balls contact at least a portion of both the second inner raceway and the second outer raceway, wherein the first inner raceway and the second inner raceway are positioned in the same orientation in which they were formed.

2. The method of claim 1, wherein, prior to forming the first inner raceway and the second inner raceway, a single piece of material comprises the first inner ring, the second inner ring, and a score line.

3. The method of claim 2, wherein separating the first inner ring from the second inner ring comprises fracturing the single piece of material along the score line.

4. The method of claim 1, wherein, prior to forming the first inner raceway and the second inner raceway, the first inner ring and the second inner ring are joined together by:
   forming the first inner ring out of a first piece of material;
   forming the second inner ring out of a second piece of material;
   applying an adhesive to corresponding surfaces of the first inner ring and the second inner ring; and
   placing the corresponding surfaces of the first inner ring and the second inner ring in contact with one another until the adhesive sets.

5. The method of claim 1, wherein, prior to forming the first inner raceway and the second inner raceway, the first inner ring and the second inner ring are joined together by:
   forming the first inner ring out of a first piece of material;
   forming the second inner ring out of a second piece of material; and
   clamping the first inner ring to the second inner ring.

6. The method of claim 5, wherein separating the first inner ring from the second inner ring comprises removing a clamping device.

7. The method of claim 1, wherein, prior to the forming the first inner raceway and the second inner raceway, the first inner ring and the second inner ring are joined together by:
   forming the first inner ring out of a first piece of material;
   forming the second inner ring out of a second piece of material; and
   forming a plurality of boreholes in the first inner ring;
   forming a corresponding plurality of threaded boreholes in the second inner ring; and
   passing a plurality of fasteners through the plurality of boreholes in the first inner ring; each of the plurality of fasteners engaging threads of the corresponding threaded boreholes of the second inner ring.

8. The method of claim 7, wherein separating the first inner ring from the second inner ring comprises removing the plurality of fasteners.

9. The method of claim 1, wherein:
   forming the first outer raceway and the second outer raceway comprises grinding the first outer raceway and the second outer raceway into the inner surface of the outer ring;
   forming the first inner raceway comprises grinding the first inner raceway into the outer surface of the first inner ring; and
   forming the second inner raceway comprises grinding the second inner raceway into the outer surface of the second inner ring.

10. The method of claim 1, further comprising:
    positioning the first inner ring inside the outer ring such that a first plurality of balls contact at least a portion of both the first inner raceway and the first outer raceway; and
    positioning the second inner ring inside the outer ring such that a second plurality of balls contact at least a portion of both the second inner raceway and the second outer raceway.

11. A method for manufacturing an integral duplex bearing, the integral duplex bearing having an outer ring, a first inner ring, and a second inner ring, the method comprising:
    grinding a first outer raceway and a second outer raceway in an inner surface of the outer ring, the outer ring having an inner surface diameter;
    grinding a first inner raceway in an outer surface of the first inner ring and a second inner raceway in an outer surface of the second inner ring such that the first inner raceway and the second inner raceway are ground with an orientation relative to each other, a single piece of material comprising the first inner ring, the second inner ring, and a score line, the single piece of material having an outer surface diameter less than the inner surface diameter of the outer ring; and
    fracturing the single piece of material along the score line in order to separate the first inner ring from the second inner ring;
    positioning the first inner ring inside the outer ring such that a first plurality of balls contact at least a portion of both the first inner raceway and the first outer raceway; and
    positioning the second inner ring inside the outer ring such that a second plurality of balls contact at least a portion of both the second inner raceway and the second outer raceway, wherein the first inner raceway and the second inner raceway are positioned in the same orientation in which they were ground.

* * * * *